United States Patent
Lin et al.

(10) Patent No.: US 7,382,589 B2
(45) Date of Patent: Jun. 3, 2008

(54) CPP WITH ELONGATED PINNED LAYER

(75) Inventors: Charles C. Lin, San Jose, CA (US); Min Li, Dublin, CA (US)

(73) Assignee: Headway Technologies, Inc., Milpitas, CA (US)

( * ) Notice: Subject to any disclaimer, the term of this patent is extended or adjusted under 35 U.S.C. 154(b) by 420 days.

(21) Appl. No.: 10/991,583

(22) Filed: Nov. 18, 2004

(65) Prior Publication Data
US 2006/0103988 A1    May 18, 2006

(51) Int. Cl.
G11B 5/33    (2006.01)
B11B 5/127   (2006.01)

(52) U.S. Cl. .............................. 360/324.11
(58) Field of Classification Search ............ 360/324.1, 360/324.12, 324.11
See application file for complete search history.

(56) References Cited

U.S. PATENT DOCUMENTS

| | | | |
|---|---|---|---|
| 5,576,914 A | 11/1996 | Rottmayer et al. | 360/113 |
| 5,668,688 A | 9/1997 | Dykes et al. | 360/113 |
| 5,739,987 A | 4/1998 | Yuan et al. | 360/113 |
| 5,825,594 A * | 10/1998 | Fukumoto et al. | 360/319 |
| 6,046,891 A * | 4/2000 | Yoda et al. | 360/324.1 |
| 6,084,752 A | 7/2000 | Sakakima et al. | 360/113 |
| 6,115,216 A * | 9/2000 | Yoda et al. | 360/317 |
| 6,118,621 A * | 9/2000 | Ohsawa et al. | 360/327 |
| 6,219,205 B1 | 4/2001 | Yuan et al. | 360/319 |
| 6,456,465 B1 * | 9/2002 | Louis et al. | 360/319 |
| 6,724,582 B2 * | 4/2004 | Funayama et al. | 360/324.1 |
| 6,747,853 B2 * | 6/2004 | Hayashi et al. | 360/324.12 |
| 6,817,086 B2 * | 11/2004 | Lu et al. | 29/603.15 |
| 2002/0097533 A1 * | 7/2002 | Funayama et al. | 360/324.1 |
| 2002/0135923 A1 * | 9/2002 | Gill | 360/73.03 |
| 2002/0141119 A1 * | 10/2002 | Saito | 360/319 |
| 2002/0154453 A1 * | 10/2002 | Ikeda | 360/322 |
| 2003/0206382 A1 * | 11/2003 | Carey et al. | 360/324.12 |
| 2004/0057162 A1 * | 3/2004 | Gill | 360/314 |
| 2005/0013061 A1 * | 1/2005 | Gil | 360/324.11 |
| 2007/0028442 A1 * | 2/2007 | Takano | 29/603.07 |

OTHER PUBLICATIONS

C. Vouille E et al., "Microscopic Mechanisms of Giant Magnetoresistance", The American Physical Society, Physical Review B, vol. 60, No. 9, Sep. 1, 1999, pp. 6710-6722.

Robert Rottmayer, "A New Design for an Ultra-High Density Recording Head Using a GMR Sensor in the CPP Mode", IEEE Trans. an Magnetics, vol. 31, No. 6, Nov. 1995, pp. 2597-2599.

* cited by examiner

Primary Examiner—Andrea Wellington
Assistant Examiner—Jason M. Garr
(74) Attorney, Agent, or Firm—Saile Ackerman LLC; Stephen B. Ackerman

(57) ABSTRACT

CPP magnetic read head designs have been improved by increasing the length of the AFM layer relative to that of both the free and spacer layers. The length of the pinned layer is also increased, but by a lesser amount, an abutting conductive layer being inserted to fill the remaining space over the AFM layer. The extended pinned layer increases the probability of spin interaction while the added conducting layer serves to divert sensor current away from the bottom magnetic shield which now is no longer needed for use as a lead.

5 Claims, 4 Drawing Sheets

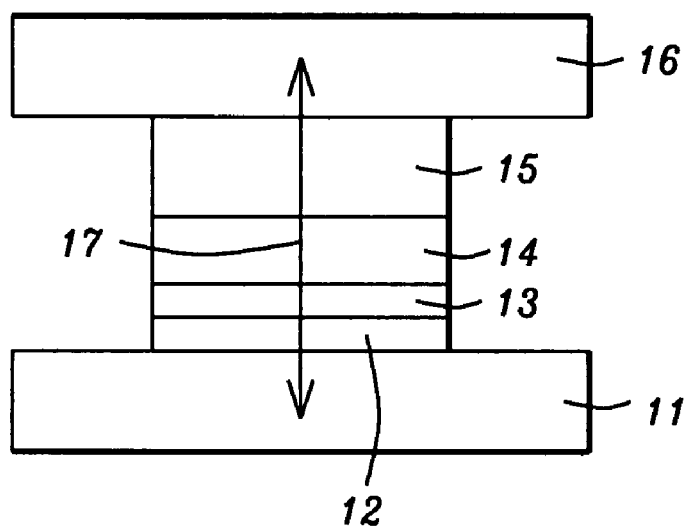
FIG. 1 - Prior Art
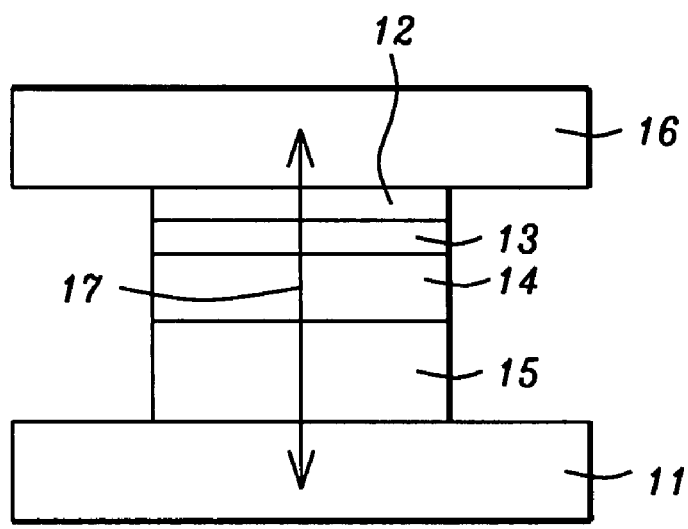
FIG. 2 - Prior Art

CPP WITH ELONGATED PINNED LAYER

FIELD OF THE INVENTION

The invention relates to the general field of magnetic GMR-type read heads with particular reference to GMR enhancement in a CPP device.

BACKGROUND OF THE INVENTION

The principle governing the operation of most magnetic read heads is the change of resistivity of certain materials in the presence of a magnetic field (magneto-resistance or MR). Magneto-resistance can be significantly increased by means of a structure known as a spin valve where the resistance increase (known as Giant Magneto-Resistance or GMR) derives from the fact that electrons in a magnetized solid are subject to significantly less scattering by the lattice when their own magnetization vectors (due to spin) are parallel (as opposed to anti-parallel) to the direction of magnetization of their environment.

The main elements of a spin valve can be seen in FIG. 1. They are lower shield/conductor layer 11 on which is (magnetically) free layer 12. Directly above the free layer is non-magnetic spacer layer 13 and above it is a (magnetically) pinned layer 14. Pinning of the latter is effected by antiferromagnetic (AFM) layer 15. Note that the pinned layer may be a single magnetically soft material such as NiFe or it could be a synthetic antiferromagnet formed by sandwiching an antiferromagnetic coupling layer between two antiparallel ferromagnetic layers. The topmost layer is magnetic shield layer 16 which also serves as a conductive lead for the device.

In the device illustrated in FIG. 1, the direction of current flow is shown as arrow 17. In other words, the current runs perpendicular to the plane of the device which is therefore referred to as a CPP device. It is also possible to arrange for the conductive leads to abut the vertical sidewalls of the GMR pedestal, in which case the structure becomes a CIP (current in plane) device. As track width grow narrower, the trend has been to favor CPP devices.

The device illustrated in FIG. 2 is essentially the same as the one seen in FIG. 1 except that the order of the elements making up the spin valve has been reversed. Both devices operate in the same way—When free layer 12 is exposed to an external magnetic field, the direction of its magnetization is free to rotate according to the direction of the external field. After the external field is removed, the magnetization of the free layer will be at a direction, which is dictated by the minimum energy state, determined by the crystalline and shape anisotropy, current field, coupling field and demagnetization field.

If the direction of the pinned field is parallel to the free layer, electrons passing between the free and pinned layers suffer less scattering. Thus, the resistance in this state is lower. If, however, the magnetization of the pinned layer is anti-parallel to that of the free layer, electrons moving from one layer into the other will suffer more scattering so the resistance of the structure will increase. The change in resistance of a device of this type is typically 8-20%.

As magnetic recording densities get beyond 100 Gbpsi, the CPP GMR sensor becomes the reader of choice. It has the advantage of better signal-to-noise ratio and, also, its signal amplitude does not scale down with device dimensions which is a necessary quality as track densities get higher. However, the signal amplitude of a CPP head is generally too small to be practically useful, because of low dR/R. The present invention discloses how this shortcoming can be overcome.

This change of resistance, dR, can be detected as a signal voltage when a current passes through. Note that the sensing current in CPP mode is flowing perpendicular to GMR stack. dR, which represents a signal amplitude, depends on the materials chosen for the free and pinned layers as well as their neighboring layers. It also depends on geometry of the device. The material is normally characterized by $\beta$, the bulk spin asymmetry coefficient, and $\gamma$, the interface spin asymmetry coefficient. The dR contribution from $\beta$ depends on how long electrons can interact in the bulk. Since the thickness of a CPP device is relatively small, being limited by the shield-to-shield spacing, it cannot contribute much and therefore the signal that can be detected is limited.

Current CPP GMR configuration suffers from an additional problem. The total device resistance comprises both the GMR and parasitic resistances, with the latter dominating. The result is degradation of dR/R to a very small value.

A routine search of the prior art was performed with the following references of interest being found:

GMR structures are disclosed in U.S. Pat. No. 5,576,914 (Rottmayer et al) and in U.S. Pat. No. 6,084,752 (Sakakima et al). In U.S. Pat. No. 5,668,688, Dykes et al describe a conductor on top of the pinning layer while Yuan et al. show conductor layers adjacent to each end of the GMR in U.S. Pat. Nos. 6,219,205 and 5,739,987.

SUMMARY OF THE INVENTION

It has been an object of at least one embodiment of the present invention to provide an improved CPP GMR magnetic read head.

Another object of at least one embodiment of the present invention has been to Improve dR by increasing the length of spin interaction.

Still another object of at least one embodiment of the present invention has been to reduce parasitic resistance by largely bypassing the AFM layer A further object of at least one embodiment of the present invention has been to reduce shield-to-shield spacing by eliminating a conductor layer in the gap.

These objects have been achieved by increasing the length of the AFM layer relative to that of both the free and spacer layers. The length of the pinned layer is also increased, but by a lesser amount, an abutting conductive layer being inserted to fill the remaining space over the AFM layer. The extended pinned layer increases the probability of spin interaction while the added conducting layer serves to divert sensor current away from the bottom magnetic shield which is now no longer needed for use as a lead.

BRIEF DESCRIPTION OF THE DRAWINGS

FIGS. 1 and 2 show prior art examples of CPP GMR read heads.

FIG. 6 is an isometric view of the structure shown in FIG. 3a.

DESCRIPTION OF THE PREFERRED EMBODIMENTS

The invention includes two novel features:

1. Elongating both the pinned and the pinning layers at the back side. The increased length is about 0.05 microns.

2. A conductor is added and abutted to the pinned and/or pinning layers.

The result of these features is that the bias current is forced to flow from the top conductor down through free layer and spacer and then to turn at the pinned layer, running out at the back side and entering the conducting lead. Thus only a portion of the bias current flows because of its high resistance.

Since the current flows in the elongated pinned layer, it has a longer interaction distance and therefore, dR is increased.

Since the current bypasses the high resistance (parasitic) portion of the head circuit, total R is reduced, thereby increasing dR/R.

In some prior art, a highly conductive layer is inserted between the magnetic shield and the AFM layer in order to direct current flow. However, this increases the total GMR height, making a very small shield-to-shield spacing impossible. The larger PW50 (pulse width at 50% amplitude) that is thereby induced will exclude it from very high linear density applications. In the present invention, the conductor is removed to the back side, enabling us to maintain a small shield-to-shield spacing.

We will now describe a process for manufacturing the present invention. Said description will also make clear the structure of the present invention.

Figure 3A:
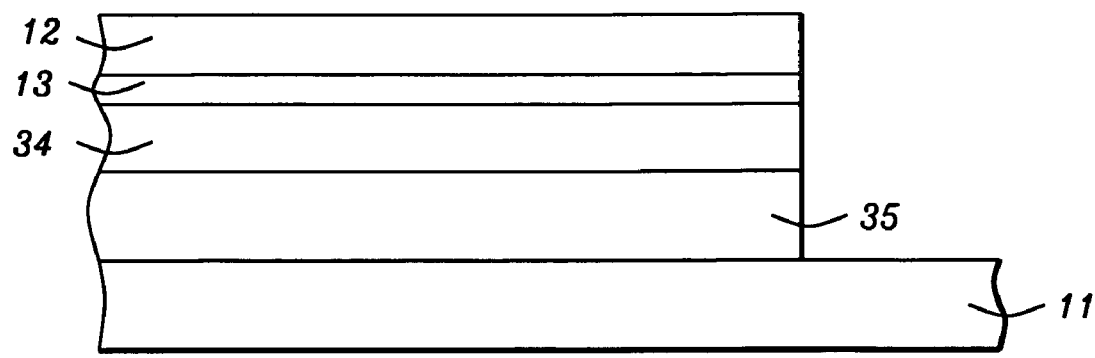
FIGS. 3a and 3b show a CPP read head modified according to the teachings of the present invention.
Figure 3B:
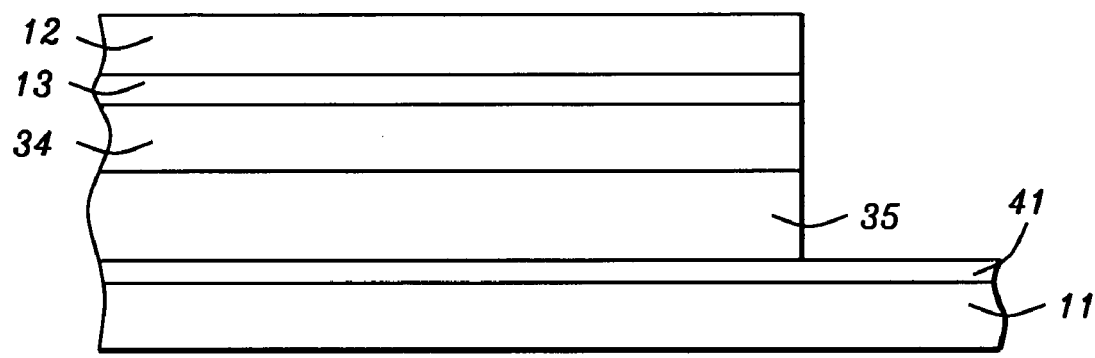

Referring now to FIG. 3b, the process of the present invention begins with the provision of a substrate (not shown) onto which is deposited bottom magnetic shield layer 11. Optionally, dielectric layer 41 is deposited onto shield 11. This dielectric layer is typically of alumina or silica and is between about 10 and 50 Angstroms thick. If it is elected to omit this layer, the structure will then be as seen in FIG. 3a.

Now follows the formation (on either dielectric layer 41 or bottom shield 11) of a CPP stack that is made up of free layer 12, spacer layer 13, pinned layer 34 and pinning layer 35. As seen in FIG. 3a or 3b, the width of this stack is then made to be less than that of the bottom shield 11 by etching down to layer 11 (or 41 if used), there being a centrally located photoresist mask on layer 12 (not shown, but having a width between about 3 and 10 microns).

Figure 4:
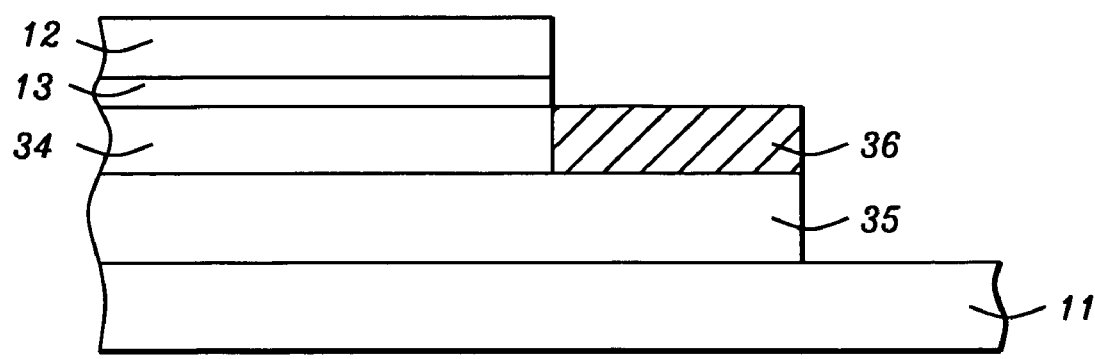
FIGS. 4 and 5 show two stages of the process of the invention.

Using a fresh photoresist mask that is narrower than the CPP stack (being between about 0.15 and 3 microns wide), the unprotected parts of the CPP stack are removed down as far as pinning layer 35. Then, as a key feature of the invention, layer 36 of conductive material is deposited onto the exposed portions of pinning layer 35. Layer 36 is typically any good conductor such as Cu, Au, Al, or AlCu and it is between about 100 and 300 Angstroms thick. Following this the photoresist mask is removed together with all conductive material that was deposited thereon, giving the structure the appearance illustrated in FIG. 4.

Figure 5:
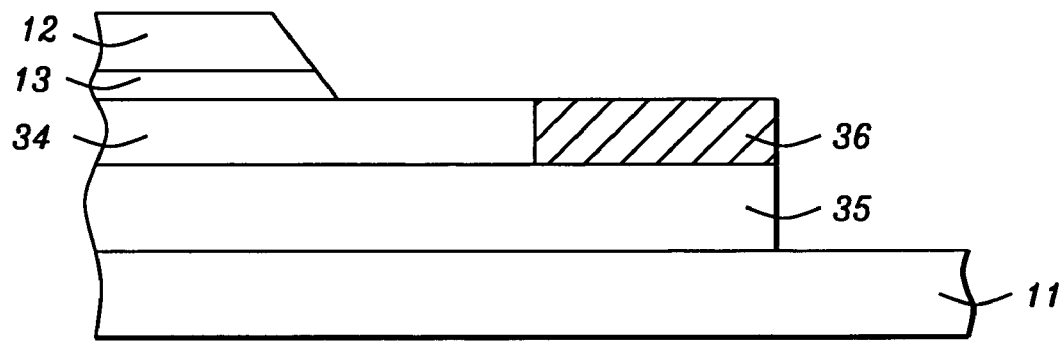

A third photoresist mask narrower than the previous mask (having a width between about 0.05 and 0.15 microns) is then used to define the read track width, following which the unprotected parts of the CPP stack are removed down to the level of the pinned layer. As can be seen in FIG. 5, a method, such as ion beam milling or etching, is used so that the remaining stack (layers 12 and 13) is given sloping sidewalls. These are necessary for the opposing longitudinal bias layers to be effective, as will be seen a little later.

Figure 6:
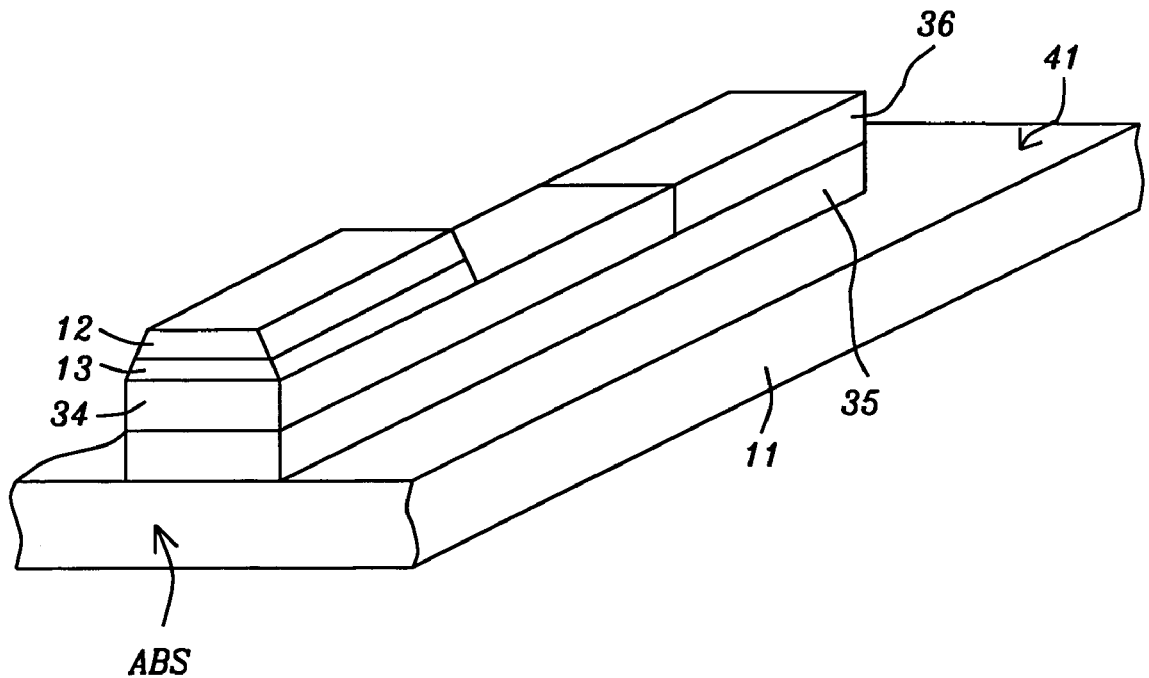
Figure 7:
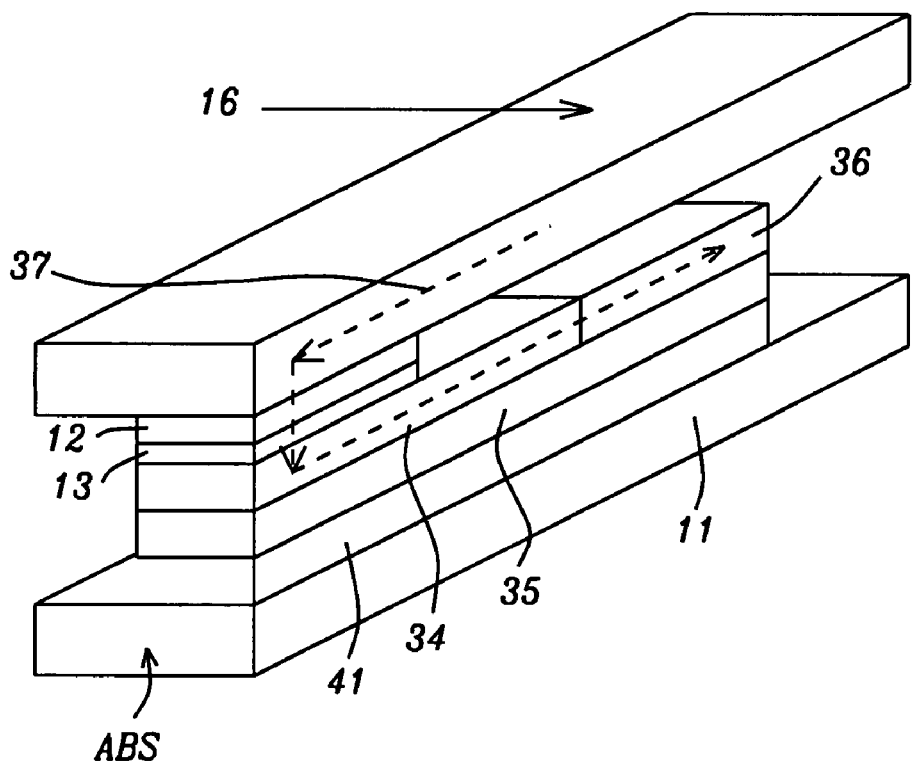
FIG. 7 is an isometric view of the completed structure
Figure 8:
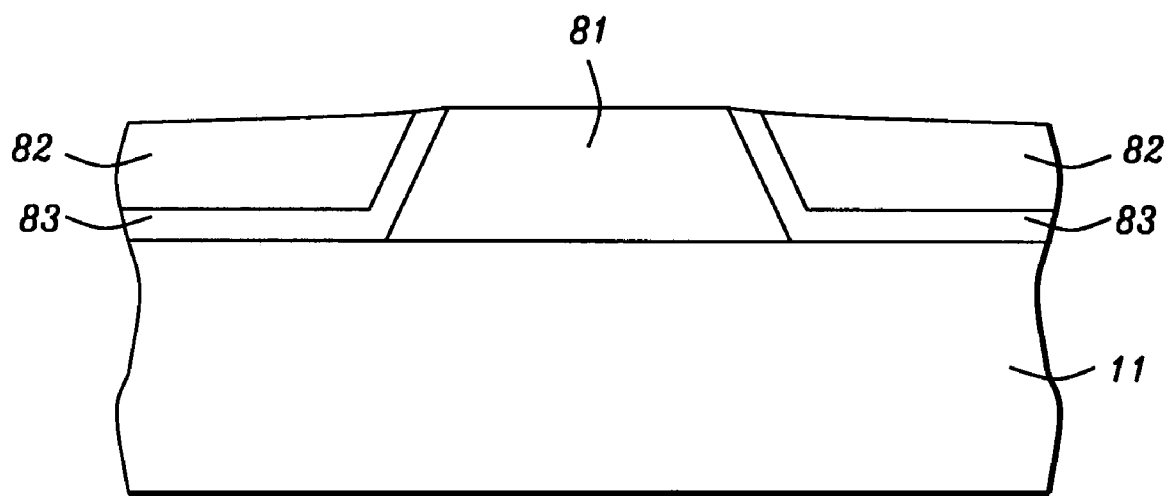
FIG. 8 illustrates how longitudinal bias is provided to the structure.

At this point in the process of the invention the structure has the appearance shown in isometric projection in FIG. 6. Proceeding with the standard process, layer of dielectric material 83 is deposited on all exposed surfaces, including the above-mentioned sidewalls, Layer 83 is alumina or silica and is between about 50 and 300 Angstroms thick. This is followed by the deposition of longitudinal bias layer 82 on dielectric layer 83 as illustrated in FIG. 8. Finally, after removal of the photoresist, top magnetic shield layer 16 is deposited, giving the completed structure the appearance illustrated in FIG. 7, with a shield to shield separation of 0.06 microns or less.

In summary then, starting at the bottom of FIG. 5, the structure of the present invention begins with lower magnetic shield layer 11. Optionally, in contact with all of layer 11 is insulating layer 41 (which may be seen in FIG. 3b). Layer 41 serves to minimize current flow 37 away from the layers above it. AFM layer 35 lies on insulating layer 41 (if this option was used) and its outside ends do not extend out as far as 11 does, being between about 3 and 10 microns long.

Pinned layer 34 lies on AFM layer 35 and does not extend for the full length of 35 (being instead between about 0.15 and 0.3 microns long) the remaining space being taken up by conductive layer 36 that abuts the right edge (in the figure) of pinned layer 34. Conductive layer 36 normally (but not necessarily) has the same thickness as 34 (between about 100 and 2,000 Angstroms). Typical materials for layer 36 include (but are not limited to) Cu, Au, Al, and AlCu.

Non-magnetic spacer layer 13 lies on pinned layer 34. Its length is less than that of 34, being the conventional length normally associated with this layer (between about 0.1 and 0.25 microns) as seen in the prior art examples FIGS. 1 and 2. The remainder of the structure is also of a conventional nature—free layer 12 and top magnetic shield 16 which also serves as the top conductor lead. However, as a result of this design, the separation between the upper and lower magnetic shields has been reduced to less than about 0.06 microns.

Once the process described earlier has been completed the structure is divided into two equal halves whose (formerly common) ends are then polished to a high degree of planarity to become air bearing surfaces (ABS). This is best seen in FIGS. 6 and 7. Note that, for reasons of improved presentation, the longitudinal bias leads shown in FIG. 8 are not shown in these figures even though they are part of the actual finished product.

What is claimed is:

1. A method to enhance performance of a CPP magnetic read head, comprising;
   providing said CPP read head, including upper and lower magnetic shields, a pinning layer on said lower shield, a pinned layer on said pinning layer, a spacer layer on said pinned layer, and a free layer between said spacer and said upper magnetic shield layers;
   extending said pinned layer so that it has a first length that exceeds that of said spacer layer;
   extending said pinning layer so that it has a second length that exceeds said first length; and
   inserting on said extended pinning layer a conductive layer that abuts said extended pinned layer and that is selected from the group consisting of Cu, Au, Al, and AlCu.

2. The method described in claim 1 wherein said pinned layer first length is between about 0.15 and 0.3 microns.

3. The method described in claim 1 wherein said pinning layer second length is between about 3 and 10 microns.

4. The method described in claim 1 wherein said upper and lower magnetic shields are separated by no more than about 0.06 microns.

5. The method described in claim 1 wherein said conductive layer has a maximum thickness of 300 Angstroms.

* * * * *